(12) United States Patent
Le Cain et al.

(10) Patent No.: US 12,736,836 B2
(45) Date of Patent: Sep. 15, 2026

(54) BATTERY USAGE OPTIMIZATION FOR SMART GLASSES

(71) Applicant: ESSILOR INTERNATIONAL, Charenton-le-Pont (FR)

(72) Inventors: Aurélie Le Cain, Creteil (FR); Paul Gil, Amiens (FR); Maëlle Richomme, Creteil (FR); Alexandre Gourraud, Fontenay sous Bois (FR); Dominick Hubacz, Creteil (FR); Willy Chaudat, Labege (FR)

(73) Assignee: Essilor International, Charenton-le-Pont (FR)

( * ) Notice: Subject to any disclaimer, the term of this patent is extended or adjusted under 35 U.S.C. 154(b) by 285 days.

(21) Appl. No.: 18/717,922

(22) PCT Filed: Nov. 29, 2022

(86) PCT No.: PCT/EP2022/083717

§ 371 (c)(1),
(2) Date: Jun. 7, 2024

(87) PCT Pub. No.: WO2023/110395

PCT Pub. Date: Jun. 22, 2023

(65) Prior Publication Data

US 2025/0046886 A1 Feb. 6, 2025

(30) Foreign Application Priority Data

Dec. 14, 2021 (EP) .................................... 21306767

(51) Int. Cl.
*G02C 7/00* (2006.01)
*G02C 7/02* (2006.01)
(Continued)

(52) U.S. Cl.
CPC .......... *G02C 7/101* (2013.01); *H01M 10/425* (2013.01); *H01M 10/44* (2013.01); *G02C 11/10* (2013.01);
(Continued)

(58) Field of Classification Search
CPC ......... G02C 7/101; G02C 11/10; G02F 1/163; H01M 10/425; H01M 10/44; H01M 2010/4271; H01M 2220/30
(Continued)

(56) References Cited

U.S. PATENT DOCUMENTS 8,902,486 B1 12/2014 Chandrasekhar
2013/0072828 A1 3/2013 Sweis et al.
2015/0070742 A1 3/2015 Sorek et al.

FOREIGN PATENT DOCUMENTS

WO 2021108018 A1 6/2021

OTHER PUBLICATIONS

International Search Report for PCT/EP2022/083717, mailed Feb. 14, 2023, 3 pages.

(Continued)

*Primary Examiner* — Mahidere S Sahle
(74) *Attorney, Agent, or Firm* — NIXON & VANDERHYE

(57) ABSTRACT

A method performed by a battery-powered electronic eyewear device for managing a battery consumption of said eyewear device based on a utilization of said eyewear device by a user, the eyewear device comprising at least one electrochromic cell, the method comprising: recording data related to the utilization of the eyewear device by the user, said utilization being based on at least the use of at least one electrochromic cell feature of the eyewear device by the user driven by electrochromic cell parameters, analyzing said recorded data and determining at least one average usage
(Continued)

pattern of the eyewear device by the user, comprising average repartitions of ideal values of said electrochromic cell parameters in the average usage pattern and/or of power consumption of the eyewear device by the user in the average usage pattern, adapting the management of the battery consumption of the eyewear device by piloting values of the electrochromic cell parameters based on at least the average usage pattern of the user and on charging data related to a remaining state of charge of the battery.

15 Claims, 5 Drawing Sheets

(51) Int. Cl.
*G02C 7/06* (2006.01)
*G02C 7/10* (2006.01)
*H01M 10/42* (2006.01)
*H01M 10/44* (2006.01)
*G02C 11/00* (2006.01)
*G02F 1/163* (2006.01)

(52) U.S. Cl.
CPC ..... *G02F 1/163* (2013.01); *H01M 2010/4271* (2013.01); *H01M 2220/30* (2013.01)

(58) Field of Classification Search
USPC ....................... 345/7–9; 351/159.03, 159.39; 359/13–14, 630–633
See application file for complete search history.

(56) References Cited

OTHER PUBLICATIONS

Written Opinion of the ISA for PCT/EP2022/083717, mailed Feb. 14, 2023, 4 pages.

BATTERY USAGE OPTIMIZATION FOR SMART GLASSES

CROSS-REFERENCE TO RELATED APPLICATIONS

This application is the U.S. national phase of International Application No. PCT/EP2022/083717 filed Nov. 29, 2022, which designated the U.S. and claims priority to EP 21306767.1 filed Dec. 14, 2021, the entire contents of each of which are hereby incorporated by reference.

FIELD OF DISCLOSURE

The present invention relates to the field of electrochromic glasses and more specifically to the power management of electrochromic eyewear devices.

BACKGROUND

The development of the Internet of Things (or IoT) enables most wireless digital devices (or smart devices) to provide a wide range of functionalities to their users. A key issue of smart devices then consists in a balance to be found between a battery autonomy of the smart device and the quality of the user experience. Indeed, depending notably on the energy consumed by the main used functionalities of the smart device, the state of charge of the battery as well as its discharging conditions, the smart device may lack power autonomy to run the functionalities required by the user on the long run—at least with an optimized efficiency—.

Most operating systems address the autonomy issue of smart devices by proposing the activation of an energy-economy mode, or “eco mode”. Such “eco mode” usually consists in a pre-configured change of settings of the smart device in order to save battery power. In the case of smartphones using the iOS operating system for example, the activation of the “eco mode” automatically reduces the screen brightness, locks the smartphone after a few seconds of non-interaction and disables the automatic update of new emails, to cite a few. The existing “eco mode” usually degrades the performance of the Central Processing Unit (CPU) and/or the Graphics Processing Unit (GPU) of smart devices to save battery. Most existing “eco modes” thus consist in a radical quality and/or efficiency degradation of functionalities of the smart device. In particular, such degradation is generic to all smart devices using a same operating system: for example, the degraded functionalities and the settings of such degradation are the same for all users of the iOS “eco mode”. As a consequence, despite enabling to save battery, current “eco modes” have a great impact on the user experience. Such “eco modes” are thus to be used in emergency (for example, when the smart device nearly runs out of battery) but are not conceived as an end to optimize battery power while guaranteeing a comfort of use.

In the specific case of electrochromic (or EC) eyewear devices (or eye glasses), functionalities related to the use of electrochromic cells—such as the automatic change of cell tint, filter or color (more generally, the automatic change of the state of tint) of the ophthalmic lenses depending on the surrounding environment—are particularly power-consuming. Indeed, compared to the rest of the hardware and software system including the GPU and CPU, the functioning of EC cells (and thus, the use of EC functionalities) consumes approximately 90 percent (%) of an average use of an EC eyewear device. Existing “eco modes” of most smart devices, which consist in drastically degrading the performance of most processing components thus have a low benefit—yet a great user impact—in the battery saving of EC eyewear devices, since such processing components consume a low fraction—approximately 10%—of the overall power compared to the EC functionalities. Document WO 2021/108018 A1 relates to such an eyewear device comprising electrochromic lenses.

SUMMARY OF THE DISCLOSURE

The present invention thus addresses the issue of managing the battery power consumption of electrochromic eyewear devices.

It is proposed a method, performed by a battery-powered electronic eyewear device, for managing a battery consumption of said eyewear device based on a utilization of said eyewear device by a user, the eyewear device comprising at least one electrochromic cell, the method comprising:

- recording data related to the utilization of the eyewear device by the user, said utilization being based on at least the use of at least one electrochromic cell feature of the eyewear device by the user, said electrochromic cell feature being driven by at least one electrochromic cell parameter,
- analyzing said recorded data and determining at least one average usage pattern of the eyewear device by the user, said average usage pattern comprising:
  - an average repartition of ideal values of said electrochromic cell parameter in the average usage pattern, and/or
  - an average repartition of power consumption of the eyewear device by the user in the average usage pattern, adapting the management of the battery consumption of the eyewear device by piloting values of the electrochromic cell parameter based on at least the average usage pattern of the user and on charging data related to a remaining state of charge of the battery.

As a consequence, the method proposes impacting the battery consumption of an electrochromic eyewear device by impacting the consumption of its most power-consuming features, that is the electrochromic cell features.

Also, the method proposes adapting the management of the battery consumption of the eyewear device in a customized way. Indeed, the management of the battery consumption takes into account the utilization of the device by each user, so that the management is performed in a personalized way. It is thus possible to minimize (or even delete) the negative impact of battery management on the usage experience of the user, since the method takes into account how the eyewear device is used and which, when and how electrochromic cell features are used. The method thus enables to adapt the battery consumption of electrochromic cell features so that the electrochromic cell features may be provided as required by the user. The method avoids the limits of existing “eco modes”, which activation usually already reflects a low-battery situation of the device and does not enable the user to fully use the device according to his or her requirements. Here, the method enables a battery optimization resulting in a repartition of battery power as required by the utilization of the user.

By data related to the utilization of the eyewear device by the user, it is understood data enabling to understand what usage of the device is made by the user. Such data may for example provide what electrochromic cell features are used and how and when such features are used. It may also be understood as data enabling to include the utilization of the device within a lifestyle of the user. Such data may for example indicate the life context in which the device may be used: such context may for example correspond to working times, vacation times of the user or various activities performed by the user (such as driving, doing workout, going to a concert etc.).

By an electrochromic cell feature, it is understood specific features provided by the device, such features using the electrochromic cells of the device. Compared to other features provided by the device, electrochromic cell features are particularly power-hungry and mainly impact the discharging rate of the battery of the eyewear device. An electrochromic cell feature may for example involve an automatic adaptation of a tint aspect of the device based on various trigger factors (such as an incoming level of light or detected states of the user for instance).

By an electrochromic cell parameter, it is understood a parameter driving an electrochromic cell feature. Each feature (electrochromic cell-related or not) provided by the device is driven by one or several parameters. An electrochromic cell feature involving an automatic adaptation of tint may be driven by parameters relating to the speed of such adaptation of tint or by the occurrence of such adaptation of tint for example.

By values of an electrochromic cell parameter, it is understood values piloting an electrochromic cell parameter. Considering a given electrochromic cell parameter, such parameter may be constant throughout time and thus take a unique value. For example, if the parameter related to the speed of adaptation of tint is constant, it means that the device, when it is functioning, provides an adaptation of tint at the same speed for any required adaptation of tint by the user. Constant values of the electrochromic cell parameters may correspond to pre-set values of parameters, set for example by the manufacturer of the device.

The parameter may also be time-variable, in which case the parameter takes several distinct values.

By ideal values, it is understood values reflecting the effective conditions of use of the features by the user based on the recorded data, that is, values providing an effective comfort of use to the user. Such ideal values of parameters notably reflects which, when and how features and their parameters are used by the user.

By piloting such values to adapt the management of battery consumption of the device, it is understood adapting the values currently piloting the parameters, and notably the electrochromic cell parameters, in order to take the requirements and the utilization of the user into account. For example, such adaptation may consist in piloting parameters to be time-variable, based on the time distribution of an average usage pattern.

By an average usage pattern, it is understood a time-distribution (or variation, or repartition) of data reflecting a typical utilization of the device by the user.

In another aspect, it is proposed an eyewear device comprising a processing circuit configured to implement the method.

In another aspect, it is proposed a computer program product comprising program instruction code stored on a computer-readable medium for the execution of the method.

In an embodiment of the proposed method, the management of the battery consumption is adapted when the remaining state of charge of the battery is below a predetermined value.

In an embodiment of the proposed method, the piloting of values of the electrochromic cell parameter varies over time depending on the average usage pattern. As a consequence, the piloting of values may consist in varying over time the values of electrochromic cell parameters, based for example on variations observed in the repartition of ideal values of such parameters.

In an embodiment of the proposed method, the electrochromic cells of the eyewear device provides at least two different states of tint. Several electrochromic cell features of the eyewear device are used by the user. Such use comprises at least the use of different states of tint among the provided states of tint, the electrochromic cell features comprising at least one element among:

- a tint transition between the different used states of tint, and
- a tint preservation within a used state of tint.

In an embodiment of the proposed method, the at least one electrochromic cell parameter comprises at least one element among:

- data related to each provided state of tint,
- data related to a number of transitions between the different provided states of tint, and
- data related to a speed of transition between the different provided states of tint.

As a consequence, the piloting of values in order to manage the battery consumption may consist in piloting values related to each provided state of tint and/or to the transitions between provided states of tint. Such piloting may notably take into account the average usage pattern. The average usage pattern may in particular reflect which states of tint are used by the user at which times and in which conditions.

In an embodiment of the proposed method, the data related to the utilization of the eyewear device being recorded over a predefined period of time, and wherein the recorded data comprises at least one element among:

- measurements of luminous flux sensed by the eyewear device within the predefined period of time,
- measurements of a discharging time of the battery, and
- a detection of a charging time corresponding to a time when the eyewear device is charged or recharged by a source of energy external to the eyewear device.

In an embodiment of the proposed method, the average usage pattern comprises an average charging cycle and the average usage pattern is delimited in time within said average charging cycle.

As a consequence, the recorded data enables the device to deduce one or several time-delimited and distributed average usage patterns. Each average usage pattern may notably define a typical discharging pattern of the device. Such discharging pattern thus reflects how the device is utilized by the user, which used features and feature parameters are the most power-consuming and how such consumption of power is allocated within time.

In an embodiment of the proposed method, the piloting of values of the electrochromic cell parameter comprises a reduction of the number of provided states of tint with respect to a pre-set number of provided states of tint. As a consequence, the device is able to optimize the battery consumption by limiting the provided number of states of tint. Such reduction may be adapted in time, so that the impact on the utilization of the device by the user is minimized.

In an embodiment of the proposed method, the electrochromic cells of the eyewear device provides at least two different levels of transmission within each provided state of tint. The piloting of values of the electrochromic cell parameter then comprises a reduction of the number of provided levels of transmission of at least one provided state of tint with respect to a pre-set number of provided levels of transmission of said at least one provided state of tint. As a consequence, the device is able to optimize the battery consumption by reducing the pre-set sensitivity of the adaptation of tint of the device. Such reduction may notably be adapted in time, so that the impact on the utilization of the device by the user is minimized. For example, such adaptation may occur on given states of tint when such states of tint are not used by the user, based on the average usage pattern.

In an embodiment of the proposed method, the reduction of the number of provided states of tint consists in an increasing of a time integration of light measurements associated to each provided state of tint. As a consequence, the device is able to optimize the battery consumption by reducing the time-reactivity of the device in automatically adapting the tint of the device. Such reduction is notably adapted in time so that it occurs with a minimized impact on the usage experience of the user.

In an embodiment of the proposed method, each provided state of tint is associated to at least one light measurement threshold. The reduction of the number of provided states of tint then comprises a piloting of a lag value applied to each said light measurement threshold. As a consequence, the thresholds delimitating each state of tint may be adapted so as to modify the number of provided states of tint. Such piloting of the lag value may for example enable to keep a same state of tint for various ranges of light measurements and thus to reduce battery consumption (by avoiding tint transitions). In particular, such piloting is adapted in time based on the average usage pattern, so as to minimize the impact of battery management on the usage experience of the user.

In an embodiment of the proposed method, the piloting of values of the electrochromic cell parameter comprises a limitation of the number of transitions between the different provided states of tint with respect to a pre-set number of transitions between the different provided states of tint.

In an embodiment of the proposed method, the piloting of values of the electrochromic cell parameter comprises a repartition, in time, of said limited number of transitions between the different provided states of tint based on the average usage pattern of the user.

As a consequence, the management of the battery consumption may be optimized by limiting in time the number of available transitions. Such limitation is adapted in time based on the average usage pattern, so as to provide enough available transitions when it is required by the user, in order to minimize the impact of battery management on the usage experience of the user.

In an embodiment of the proposed method, the piloting of values of the electrochromic cell parameter comprises a decrease of the speed of transition between the different provided states of tint with respect to a pre-set speed of transition between the different provided states of tint. Indeed, decreasing such speed of transition enables to save battery consumption. Such speed decrease may be applied at times determined based on the average usage pattern, in order to minimize the impact of battery management on the usage experience of the user. For example, the speed decrease may be applied when it is determined, based on the average usage pattern, that the user does not require tint transitions.

BRIEF DESCRIPTION OF THE DRAWINGS

Other features, details and advantages will be shown in the following detailed description and on the figures, not in a limitative way, on which.

DETAILED DESCRIPTION OF THE EMBODIMENTS

Figure 1:
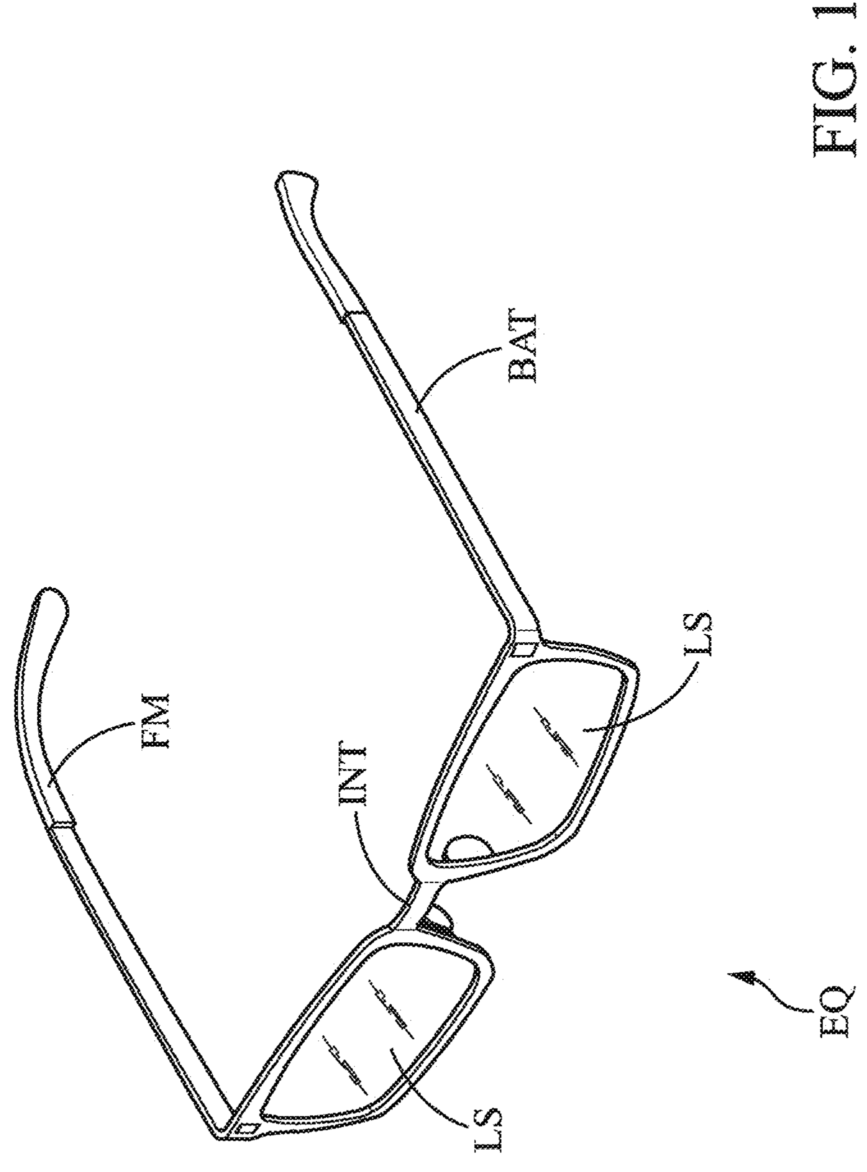
FIG. 1 is a schematic representation of an electrochromic eyewear device according to an embodiment of the invention.
Figure 1:
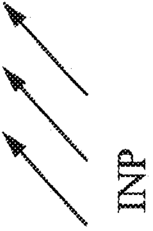

It is now referred to FIG. 1. FIG. 1 is a schematic representation of an electrochromic (or EC) eyewear device, also referred to in the present description as "EC smart glasses EQ or "device" EQ. The EC eyewear device EQ includes at least one lens LS and a plurality of electronic and/or electrical components (not detailed on FIG. 1), assembled altogether by a frame FM. Such plurality of components will be detailed in the further description of FIG. 2. In a preferred embodiment, the device EQ includes a pair of lenses LS. The device EQ may be worn by a user so that the lenses LS cover the eyes of the user.

Each lens LS is able to undergo a change of transmittance. Such change of transmittance may occur when incident light photons reach a sensing interface INT of the device EQ. Such change of transmittance may also depend on the application of an electrical signal on the lens LS, such electrical signal being generated by one or several components of the device EQ. To that end, each lens LS is composed by a stack of layers (not detailed on FIG. 1), also referred to as the "electrochromic stack". Such stack has a thickness in the range of a few microns (μm). In particular, each lens LS comprises an electrochromic layer (or EC layer). The electrochromic layer may be composed with tungsten oxide for example, or any other component enabling a change of transmittance. The stack of layers may also comprise transparent conductor, electrolyte and/or glass layers.

The EC eyewear device EQ provides the user with a plurality of functionalities, also referred to as "features". Such functionalities are enabled by the plurality of components of the device EQ. Such functionalities may notably comprise:

- communicating with other equipments via Bluetooth, using a wireless communication network; and/or
- collecting data, such data being for example related to the surrounding environment of the device (such as weather data) and/or to usage parameters of the device EQ; and/or
- tracking the head or body posture of the user of the device EQ; and/or
- providing a haptic feedback, for example via a tactile user interface; and/or
- displaying updated data to the user of the device EQ, for example via a dashboard; and/or
- performing gaze tracking; and/or
- displaying an adapted augmented reality overlay.

The EC eyewear device EQ also provides specific features using the electrochromic cells of the lenses LS of the eyewear device EQ. Such specific features are referred to as "electrochromic cell features" of "EC features". The electrochromic cell features mainly consist in providing the user of the electrochromic eyewear device EQ with a smart adaptation of the tint, shade and/or tone for at least part of the lenses LS of the device EQ. Such EC features may for example concern:

- different classes of tint of the lenses LS provided by the device EQ; and/or
- different filters of the lenses LS provided by the device EQ; and/or
- different colors of the lenses LS provided by the device EQ.

Classes of tint of the lenses LS provided by the device EQ may for example refer to classes of darkened and bleached tints of the lenses LS, depending on an incoming luminous flux.

Filters of the lenses LS provided by the device EQ may for example refer to blue light filter, cataract filter, migraine filter or night drive filter.

Colors of the lenses LS provided by the device EQ may for example refer to blue, orange or yellow-colored lenses LS. Colors of the lenses LS may for example be used to improve contrast when displaying an augmented reality overlay.

The different classes of tint, filters and colors of the lenses LS provided by the device EQ are more generally referred to as the "states of tint" of the lenses LS provided by the device EQ. In other words, a state of tint of the lenses LS of the device EQ may refer to a given class of tint, filter and/or color of the lenses LS. In an embodiment, such features may be combined (for example, the lenses LS of the device EQ may provide colored and filtered lenses LS). Such features may also be provided for a whole lens LS or for a portion of the lens LS.

A given state of tint of the lenses LS of the device EQ may also provide different levels of transmission. Such levels of transmission may for example refer to different shades of within a given class of tint in order to adapt the sensitivity of the device EQ to a various panel of light transmission.

The EC features related to the classes of tint (respectively to the filters and/or to the colors) may for example consist in:

- transiting between different classes of tint (respectively filters and/or colors) of the lenses LS, and/or
- preserving the lenses LS within a given class of tint (respectively a given filter and/or color), and/or
- transiting, within a given class of tint (respectively a given filter and/or a given color), between different levels of transmission.

Each feature provided by the device EQ via the communication module COM is driven by one or several feature parameters. In particular, electrochromic cell features are driven by one or several electrochromic cell parameters.

For example, an electrochromic cell feature of the device EQ consists in changing the state of tint of the lenses LS depending on an incoming lighting level (also referred to as "luminous flux") and/or on one or several trigger factors. Such trigger factors may relate to the user of the device EQ or to the external environment surrounding the device EQ. Such trigger factors may refer, for example, to an emotion of the user detected by the device EQ, to a static and/or dynamic state of the user detected by the device EQ, to a posture of the user detected by the device EQ or to an activity of the user detected by the device EQ (such as driving or running etc.). The change of state of tint may thus be driven by several parameters, including:

- the number of distinct states of tint provided by the device EQ. For instance, the device EQ may provide three distinct classes of tint of the lenses LS, the first class of tint being 0% tinted (the incoming luminous flux is fully transmitted to the eyes), the second class of tint being 30% tinted (70% of the incoming luminous flux is transmitted to the eyes) and the third class of tint being 70% tinted (70% of the incoming luminous flux is transmitted to the eyes). In the context of the present description, the device EQ is able to provide a plurality of different states of tint.
- the overall number of transitions between the different provided states of tint within a delimited period of time, for instance 24 hours or seven days.
- the number of transitions per type of tint change within the delimited period of time. For example, in the case of three distinct states of tint provided by the device EQ, the number of transitions between the first and the second states of tint used during the delimited period of time may differ from the number of transitions between the first and the third states of tint during the same period of time.
- the speed of transition during a tint change.
- the sensitivity of the light transmission (or levels of transmission) within each state of tint. For example, a first class of tint provided by the device EQ may transmit 100% of the incoming luminous flux to the eyes or may transmit between 80% and 100% of the incoming luminous flux depending on the sensitivity of the light transmission of the first class of tint.
- the lux thresholds delimiting each provided state of tint, as well as a possible lag value (or margin error, or lux hysteresis) associated to such thresholds. Each state of tint of the lenses LS provided by the device EQ depends on the incoming luminous flux. Such incoming luminous flux may be measured in lux (1×). The more luminous flux being received by the lenses LS, the more tinted the lenses LS are required to be. For example, a second class of tint may be provided when the incoming luminous flux is between 500 and 10000 lux, with a lag value of 10% (or equivalently, when the incoming flux is between 450 and 11000 lux).

Each feature parameter may take one or several values. Each feature parameter may notably be a time function (either constant or variable). For example, the electrochromic cell parameter corresponding to the number of distinct filters provided by the device EQ is considered. Such number of provided filters may take a unique value, for example five. In such case, it means that five filters are available to the user at any time, providing that the remaining battery power enables the device EQ to run. Such number of provided filters may also be time-variable: depending on a predefined timeline, five filters may be available to the user on some time periods of the timeline, while "only" three filters may be available to the user on some other time periods of the timeline. The values taken by feature parameters will be detailed further in the description.

The values taken by a feature parameter may notably depend on a mode of use of the electrochromic eyewear device EQ.

Other parameters may involve the voltage and/or the current applied by the electrochromic stack of the device EQ or trigger factors for changing the color of the lenses LS.

The EC eyewear device EQ has a power autonomy so that the device EQ may wirelessly provide the user with the aforementioned functionalities and pilot the various parameters driving such functionalities. To that end, the device EQ is powered by a rechargeable battery BAT. The battery BAT has predefined and/or pre-configured parameters such as the voltage and the capacity ratings of the battery BAT.

Figure 2:
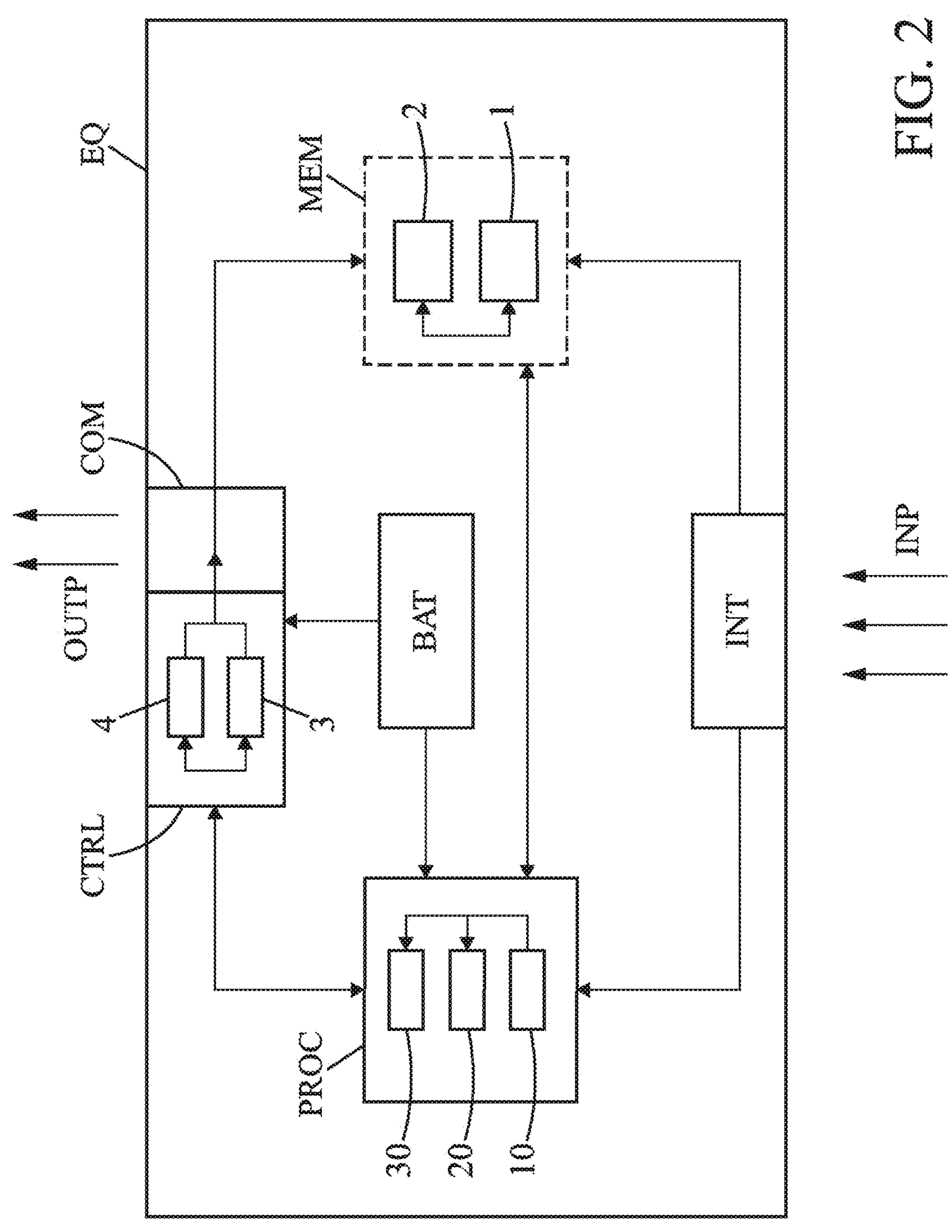
FIG. 2 is a schematic representation of an electrochromic eyewear device according to an embodiment of the invention.

It is now referred to FIG. 2. FIG. 2 is a schematic and functional representation of an electrochromic (or EC) eyewear device EQ. The eyewear device EQ is composed by a plurality of electrical and/or electronic components, such components being inter-connected to form several functional units INT, MEM, PROC, CTRL, COMM of the device EQ.

The electrochromic eyewear device EQ is able to receive information and collect data. Such information and data may come from surrounding terminals such as mobile computer equipments and/or distant servers, from the environment surrounding the device EQ, from the user of the device EQ and/or result from interactions between the device EQ and the environment surrounding the device EQ. To that end, the device EQ comprises a sensing interface INT.

The device EQ is notably able to measure the light brightness perceived by the device EQ (and a priori by the user wearing the device EQ). To that end, the sensing interface INT may comprise a lux meter. The device EQ may also be able to receive data related to the ambient temperature. To that end, the sensing interface INT may comprise a thermometer. The device EQ may also collect visual and/or audio data. To that end, the sensing interface INT may comprise a camera and/or an audio recorder. The device EQ may also receive data provided by the user of the device EQ. To that end, the sensing interface INT may comprise a human/machine interface comprising for example a touch screen and/or physical switches, joysticks etc. The device EQ may also be able to detect data related to an emotional state and/or a state of activity of the user (such as workout, reading, driving activities etc.). To that end, the sensing interface INT may comprise means for measuring a cardiac frequency, a respiratory rate, a sweat level etc. The device EQ may also be able to receive data and/or control signaling from terminals and/or distant servers, using a wireless communication network. The device EQ may access a broadband cellular network such as 3G/4G/5G systems. The device may also access to a cloud. The device EQ may access and/or synchronize with surrounding equipments such as a smart phone or a smart watch of the user. The device EQ may thus access to data related to, for example, a personal agenda of the user, a geolocation of the user (via for example global navigation satellite system or GNSS), and/or to climate forecast information from the internet, cloud, the cell phone and/or other external resources. To that end, the sensing interface INT may comprise a wireless communication module. The device EQ may communicate using device-to-device (or D2D) communication. The device EQ may communicate using Wi-Fi, Bluetooth communication, and/or other wireless communication technologies.

The data collected by the device EQ is timestamped. To that end, the sensing interface INT is linked to a timestamp.

The data collected by the sensing interface INT is generically referred to as "input data" INP.

The device EQ is able to receive energy from an external source of energy. To that end, the sensing interface INT may comprise an energy input. Such energy input may correspond to a plugging input (such as a Universal Serial Bus or USB port) for physically connecting the device EQ to an external source of energy. The energy input may also correspond to a photovoltaic module. The energy input may also correspond to a piezoelectric, an electrostatic, and/or an electromagnetic module for movement charging. The energy input may also correspond to a Seebeck effect module for thermal harvesting. Such energy received by the device EQ may be stored on the device EQ so that the device EQ is provided with a power autonomy—at least for a temporary time—. The device EQ may thus be used wirelessly. To that end, the device EQ is powered by an electrical battery BAT. The battery BAT of the device EQ is rechargeable, for example when the device EQ is connected to the external source of energy via the energy input. The battery BAT of the electrochromic eyewear device EQ has a predetermined voltage (in volts or V). The battery BAT has a predefined capacity (in Ampere hours or Ah), such capacity notably depending on the past history of the battery BAT, the age of the battery BAT, the charging and discharging rates of the battery BAT or the temperature for example. At a given time, the battery BAT has a state of charge (or SOC), expressed in percentage (%) and reflecting the remaining amount of energy stored in the battery BAT to be used compared to the amount of usable energy. In the context of the present description, the state of charge of the battery BAT is considered to run from 100% (the battery BAT is considered fully charged) to 0% (the maximal amount of energy that the battery BAT may provide—in other words, the depth of discharge—is reached). In particular, the battery BAT may be considered to have reached a state of charge of 0% even if the capacity of the battery BAT is not reached: indeed, a full discharge of the battery BAT may cause an irreversible degradation of the battery BAT thus, most batteries are manufactured to limit the discharge to a depth of discharge inferior to the battery capacity (for example, a depth of discharge of 75% means that 75% of the battery capacity can be used). As a consequence, in the context of the present description, the state of charge reflects the effective remaining usable energy of the battery BAT, taking the depth of discharge of the battery BAT into account.

The device EQ may also be able to manage and overview the functioning conditions of the battery including a monitoring of the state of charge of the battery BAT. To that end, the battery BAT may be connected to a battery management system (or BMS), not represented on FIG. 2.

The electrochromic eyewear device EQ is able to provide various functionalities or features, electrochromic-related or not. To that end, the device EQ comprises a communication interface COM. In an embodiment (not illustrated on FIG. 2), the communication interface COM and the sensing interface INT are connected. In an embodiment (not illustrated on FIG. 2), the communication interface COM and the sensing interface INT may form one single module of the device EQ. The device EQ is able to transmit information and/or signals to the user of the device EQ and/or to other computer terminals. Such signals may consist in a wireless communication of the device EQ with distant computer terminals, using for example Bluetooth and/or Wi-Fi protocols. To that end, the communication module COM may comprise a transmitter. The device EQ may also transmit haptic feedbacks to the user of the device EQ. To that end, the communication module COM may comprise a touch/proximity sensor and/or physical switches. The communication module COM may be connected to the frame FM of the electrochromic eyewear device EQ and/or to the lenses LS of the electrochromic eyewear device EQ. The device EQ may also emit sensory alerts to the user of the device EQ. To that end, the communication module COM may comprise a speaker, a displaying screen and/or a touch-sensitive surface. The device EQ may also be configured to modify the stack layer of the lenses LS in order to maintain or change the state of tint, the color and/or the filter of the lenses LS. The device EQ may also be configured to display a visual content (such as a virtual or augmented reality content) to be seen by the user of the device EQ via the lenses LS. To that end, the communication device COM may be connected to (or comprise) an electrical circuit, such circuit being designed to provide the lenses LS with an electrical signal.

The signals, data and overall information provided by the electrochromic eyewear device EQ via the communication module COM are referred to as "output data" of the device EQ.

The feature parameters (comprising the electrochromic cell parameters) may be piloted by the device EQ. By piloting feature parameters, it is understood that the device EQ may determine and apply the values taken by the feature parameters throughout time during the usage time of the device EQ by the user. To that end, the electrochromic eyewear device EQ includes a control module CTRL. The control module CTRL is able to pilot the feature parameters in order to control the output data. To that end, the control module CTRL may be connected to the communication module COM. The control module CTRL may pilot the feature parameters according to a standard mode. Such standard mode may refer to a preconfigured mode, wherein feature parameters are piloted by values pre-set by the manufacturer of the device EQ for example. The pre-set values may also be set by the user of the device EQ, for example when the user configures the device EQ. To that end, the control module CTRL may comprise a standard driving unit 3. Such standard driving unit 3 may pilot the feature parameters according to the pre-set values. Such piloting according to pre-set values may be constant throughout time and enable all features provided by the device EQ to be used at the extent intended by the manufacturer of the device EQ, providing the remaining state of charge of the battery BAT. In other words, the values driving the feature parameters of the device EQ in standard mode may be constant. For example, if the device EQ is manufactured to provide four distinct states of tint, the standard mode piloted by the standard driving unit 3 enables the device EQ to constantly provide all four states of tint (any state of tint among the provided states of tint may be used by a user of the device EQ at any time), until the remaining power provided by the battery BAT becomes insufficient to run the device EQ. Another example is the number of filters that may be applied to the lenses LS of the device EQ. The standard mode piloted by the standard driving unit 3 may enable all provided filters to be used at any time until the remaining power provided by the battery BAT becomes insufficient to run the device EQ. The standard mode of functioning of the device EQ may include a sleep mode of the electrochromic eyewear device EQ, which enables the features of the device EQ to save battery consumption when the device EQ is not used by the user.

The control module CTRL may also pilot the feature parameters according to a battery optimization mode. Such battery optimization mode may refer to a specific piloting mode wherein the feature parameters, specifically including the electrochromic cell parameters are piloted according to customized values. Such customized values may result from a processing by the device EQ. The battery optimization mode aims at adapting the parameters driving the features provided by the device EQ based notably on the effective use of the device EQ by the user. The functioning of the battery optimization mode as well as the determination of such customized values will be further detailed in the description of FIGS. 3 to 5. In order to pilot the feature parameters according to the battery optimization mode, the control module CTRL may comprise an economy driving unit 4. Such economy driving unit 4 may pilot the feature parameters according to the customized values. Such customized values are notably time-specific and may thus vary and/or be updated throughout time. To that end, the economy driving unit 4 may obtain the customized values based on data received from a processing unit PROC of the device EQ.

The electrochromic eyewear device EQ is able to store information. Such information may include the input data INP collected by the sensing interface INT of the device EQ. Such information may also comprise data preconfigured by the manufacturer of the device EQ. To that end, the device EQ includes a memory unit MEM. Said memory unit MEM may comprise a volatile memory unit 1. Said memory unit MEM also comprises a main memory unit 2.

The electrochromic eyewear device EQ is able to process information in order to provide functional features. The device EQ is able to generate the content of the output data, notably by generating the parameters driving such output data. Such content may for example be based on the processing of the input data INP and/or the data stored in the memory unit MEM. Such content may also be based on the processing of data received from the battery BAT, for example via the battery management unit. To that end, the device EQ includes a processing unit PROC. Such processing unit PROC may be connected to the sensing interface INT, to the memory unit MEM, to the battery BAT and/or to the control unit CTRL. Such processing unit PROC may be a multiprocessing unit. In particular, the processing unit PROC is able to determine customized values to pilot the feature parameters.

The processing unit PROC is able to gather and arrange the data input INP into a formatted set of data to be processed by the processing unit PROC. To that end, the processing unit PROC may comprise a data pre-processing unit 10. The data pre-processing unit 10 may comprise at least one sub-unit performing data cleansing algorithms.

The processing unit PROC is also able to segment the pre-processed data in order to identify one or several average usage patterns of the user of the device EQ. To that end, the processing unit PROC may comprise a pattern recognition unit 20. The pattern recognition unit 20 may comprise at least one sub-unit performing data labelling, data mining, image and/or audio recognition, machine learning and/or more generally pattern recognition algorithms. The pattern recognition unit 20 is able to arrange data into specific data sets such as training, test and validation sets to be used for supervised and/or unsupervised machine learning algorithms.

The processing unit PROC is also able to calculate the values of feature parameters for piloting the features provided by the device EQ. In particular, the processing unit PROC is able to calculate the customized values to be applied to the feature parameters in the context of a battery optimization driven by the control module CTRL. The processing unit PROC is thus able to process data obtained from the pattern recognition unit 20 in order to perform a prediction of such customized values. To that end, the processing unit PROC may comprise a data prediction unit 30.

The operations performed by the processing unit PROC may be timestamped. The data outputted by the processing unit PROC may be timestamped. To that end, the processing unit PROC may comprise a timestamp.

The processing unit PROC may also comprise a graphics processing unit (or GPU).

Figure 3:
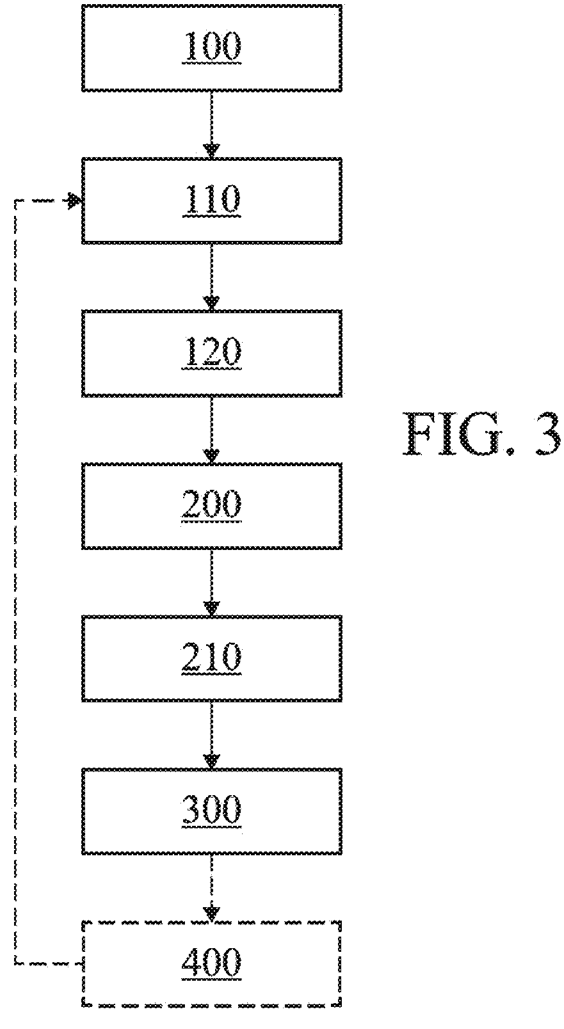
FIG. 3 represents a flowchart showing steps for managing the battery power on an electrochromic eyewear device according to an embodiment of the invention.
Figure 4:
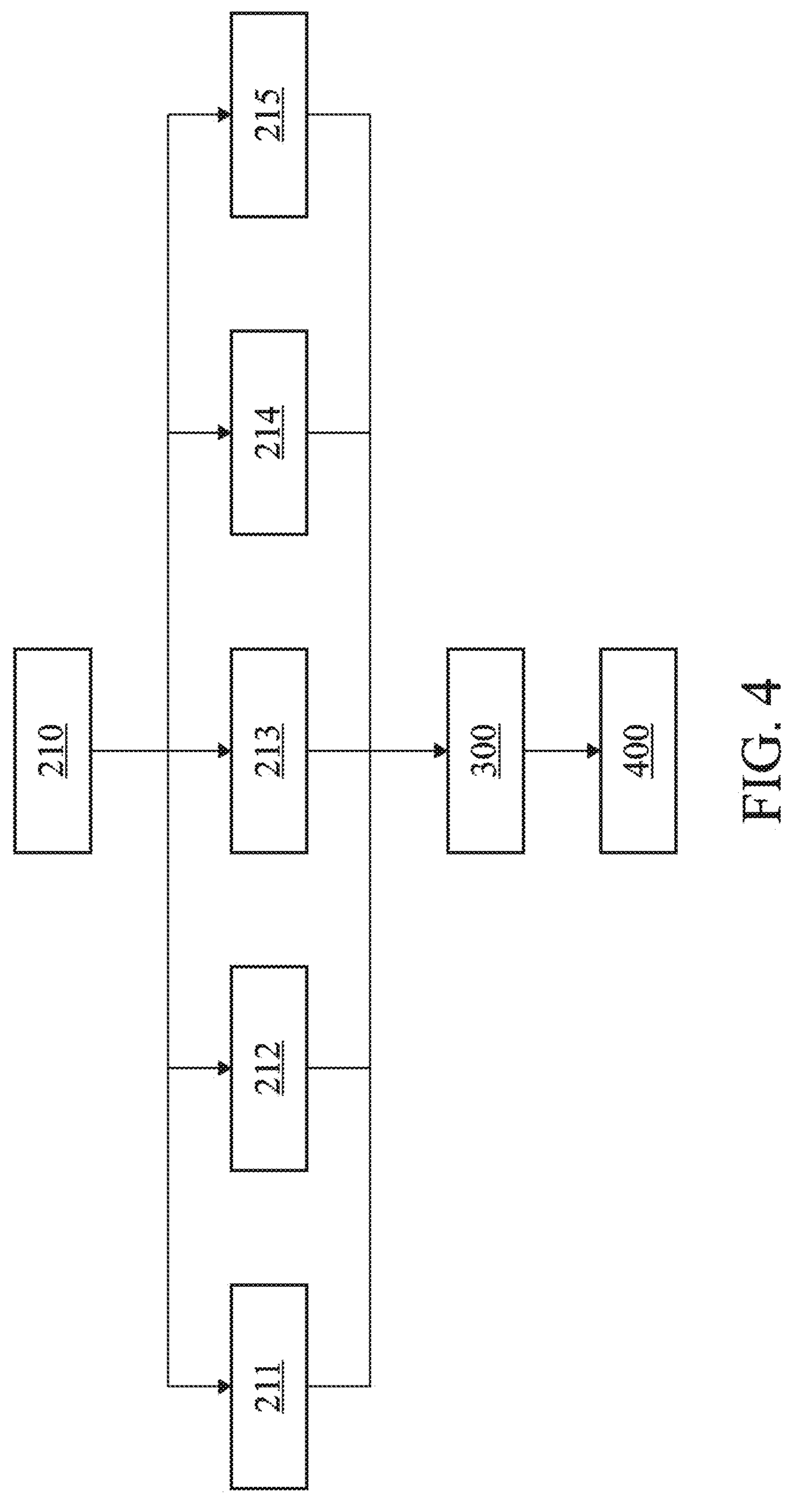
FIG. 4 represents an average usage pattern according to an embodiment of the invention.
Figure 5:
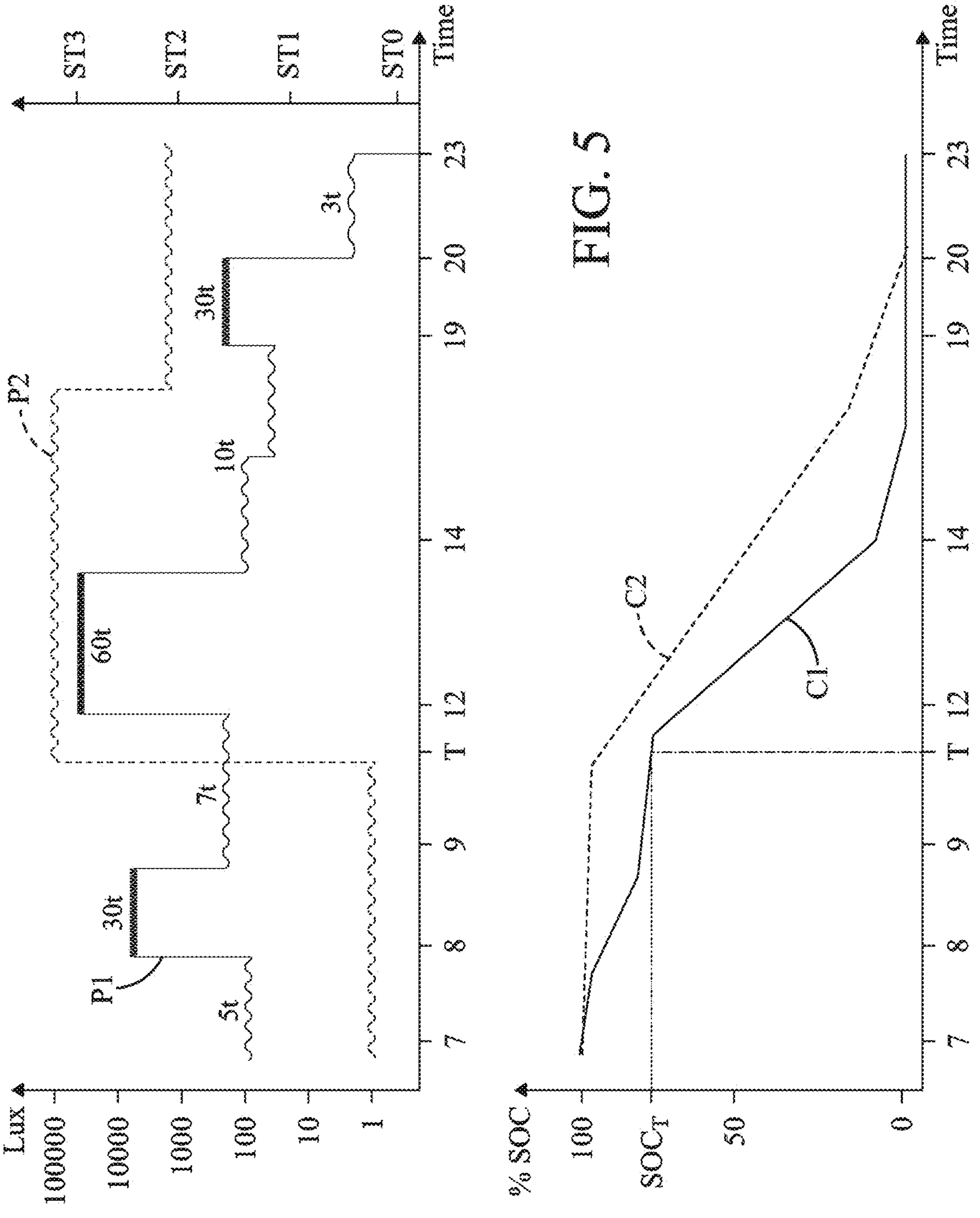
FIG. 5 represents a flowchart showing steps for piloting electrochromic cell parameters according to an embodiment of the invention.

FIGS. 3 to 5 focus on different aspects of the functioning of the electrochromic eyewear device EQ using the battery optimization mode. When (or if) the battery optimization mode is not used, the device EQ is supposed to function in the standard mode.

It is now referred to FIG. 3. FIG. 3 represents a flowchart showing steps for piloting the features of an electrochromic eyewear device EQ in a battery optimization mode. The functioning of such battery optimization mode takes into account both the specific utilization of the device EQ by each user and the electrochromic-nature of most features of interest of the electrochromic eyewear device EQ.

The piloting of the parameters in the battery optimization mode may be triggered by the user (for example if the user selects, via the human/interface machine of the device EQ, the battery optimization mode). The piloting of the parameters in the battery optimization mode may also automatically occur when the state of charge of the battery BAT is detected, for example by the battery management system of the battery BAT, to be below a predefined threshold (for example 50% or 20% of the capacity of the battery BAT). The piloting of the parameters in the battery optimization mode may also be permanently set.

The steps 100 to 400 represented on FIG. 3 may be performed by an electrochromic eyewear device EQ as schematized on FIGS. 1 and/or 2. The electrochromic eyewear device EQ is considered to be in operation and used by a given user.

At a step 100, the device EQ proceeds to a data collection step. Such data collection step may be performed by the sensing interface INT and the battery management system of the battery BAT of the device EQ.

Data related to the utilization of the electrochromic eyewear device EQ by the user is collected. Such data notably comprises:

- the times and/or durations of use of the device EQ. For example, during step 100, the device EQ may record the times and/or the durations during when the device EQ is switched on, off, is worn by the user, and/or is in a sleep mode for instance.
- the identification of the used features. During step 100, the device EQ may record the number of times each provided feature is utilized by the user, such counting consisting for example in counting the number of times each application of the device EQ is activated and/or each time the lenses LS receive an electrical signal (such as a current for example).
- the times and/or durations of use of each used feature. For example, the device EQ may record timestamped data related to when each provided feature is activated or deactivated by the user.
- the parameters of use of each used feature. For example, the device EQ may record the different used states of tint of the lenses LS by the user, among all states of tint provided by the device EQ. The device EQ may also record the number of transitions performed on the lenses LS between each couple of used states of tint.

The data collected at step 100 may also include the input data INP collected by the sensing interface INT. The data collected at step 100 may specifically include measurements of the incoming luminous flux on the device EQ. The data collected at step 100 may also include weather data such as the ambient temperature for example. The data collected at step 100 may also include images captured by the sensing interface INT. The data collected at step 100 may also include data resulting from interactions between the user and the human/machine interface of the device EQ. The data collected at step 100 may also include data obtained by the device EQ based on a wireless synchronization with other equipments, such as other surrounding smart equipments used by the user. For example, the data collected at step 100 may comprise data related to past and/or future events and/or activities joined by the user.

The data collected at step 100 may specifically include data related to the charging (or recharging) and discharging conditions of the device EQ. For example, the device EQ may record the times and/or durations when the electrochromic eyewear device EQ is connected to the external source of energy so as to recharge the battery BAT. The data collected at step 100 may include data collected from the battery management system of the battery BAT.

In particular, step 100 is performed on a predetermined period of time. For example, step 100 may be performed during several days, weeks or months. In an embodiment, step 100 may be a continuous background step operated concurrently with the other steps 110 to 400 of the piloting process.

The data collected during step 100 are timestamped, so that the data collected can be arranged in time and further interpreted within a time pattern of use of the device EQ. The data collected during step 100 may form time series.

The data collected during step 100 may be stored on the memory unit MEM.

As the outcome of step 100, the electrochromic eyewear device EQ has collected timestamped data over a predefined period of time, such data reflecting the utilization of the device EQ, the user preferences and the surrounding environment of the device EQ throughout such period of time. The collected data notably reflects what features of the device EQ are mainly used by the user, how such features are used (notably the values of the feature parameters driving the used features and the frequency of use of the features) and when such features are used.

At steps 110 and 120, the device EQ proceeds to a usage analyzing step.

The usage analyzing step first consists in analyzing, at step 110, the data collected at step 100. Such data analyzing step 100 is performed by the pre-processing unit 10 of the processing unit PROC of the device EQ.

The analyzing step 100 of the collected data may include a data cleansing operation. The data cleansing operation notably enables to clean the collected data from unexploitable data. For example, the data cleansing operating may consist in identifying and deleting unexploitable or useless information. Such unexploitable and/or useless information may include pieces of data without a timestamp; duplicates; inaccurate, inconsistent or absurd pieces of data (for example, data related to the use of a feature timestamped with a time when the device EQ is recorded to be switched off); uninterpretable pieces of data (for example, blurry images captured by the sensing interface INT). The data cleansing operation may also include fixing data incompleteness based on statistical methods for example. At the end of the data cleansing operation, the collected data is cleaned into one or several exploitable datasets.

The analyzing step 110 of the collected data may also include a statistical analysis of the exploitable datasets. The datasets may be arranged into one or several temporal series reflecting the different utilizations of the device EQ on similar time patterns. The datasets may also be analyzed in order to study the frequency of use of specific features.

The usage analyzing step then consists in establishing, at step 120, average usage patterns of the device EQ by the user. Such search for average usage patterns 120 is performed by the pattern recognition unit 20 of the processing unit PROC of the device EQ. At step 120, the pattern recognition unit 20 determines a search for one or several average usage patterns of the device EQ by the user, such usage patterns being based on the data collected at step 100 and reflecting the specific usage of the device EQ by the user. An average usage pattern refers to an average timeline in a given period of time (for example a day) wherein the features of the device EQ used by the user and the average values of the parameters driving such features are distributed. Such average values of the parameters may result from the gathering of a plurality of time series collected at step 100. For example, data collected at step 100 may comprise a plurality of distributions of values driving a given feature parameter during the timespan of the data collection step 100. An average distribution of such values may be represented within the average usage pattern. Such average distribution may be obtained via a mean of the plurality of distributions of values. Such average distribution may also be obtained via a median of the plurality of distribution of values. Such average distribution may also be obtained by selecting, at each timestep of the time span of the average usage pattern, a representative value of the plurality of distributions of values.

Each average usage pattern has a timespan and is delimited in time. For example, an average usage pattern may spread (in time) on a full discharging/recharging cycle of the battery BAT of the device EQ. The average usage pattern may also spread from a time when the disposable state of charge of the battery BAT is maximal (i.e., full) to a time when such state of charge is fully spent. For example:

- a first average usage pattern may spread from a day N (N referring to an integer) at 6 am (corresponding for example to a time when the device EQ is turned up by the user) to the same day N at 11 pm (corresponding for example to a time when the device EQ is turned off by the user).
- a second average usage pattern may spread from a day N at 7 am (corresponding for example to a time when the device EQ is turned up by the user) to a day (N+1) at 7 am (corresponding for example to a time when the device EQ is first used by the user when the battery BAT is recharged at a full state of charge).
- a third average usage pattern may spread from a day N at 10 am (corresponding for example to a time when the device EQ is turned up by the user) to a day (N+2) at 10 pm (corresponding for example to a time when the device EQ runs out of battery BAT).

The timespan of the average usage pattern may be delimited within the times of charge or recharge of the battery BAT of the device EQ.

In the context of the present description and for the sake of simplicity, an average usage pattern is considered on one day (that is, the battery BAT of the device EQ is recharged every day) but in other embodiments, an average usage pattern may spread on a time longer or shorter than a day, notably depending on the charging and discharging rates of the battery BAT of the device EQ and on the state of health of such battery BAT.

In particular, the utilization of the device EQ by the user may be described with several distinct average usage patterns. Indeed, a full cycle of the battery BAT of the device EQ may be performed in different ways and at different charging and discharging rates, depending on the various utilizations that the user may have of the device EQ or on the weather conditions. Indeed, the data recorded at step 100 on a working day of the user will differ from a vacation day of the user for instance.

To that end, the pattern recognition unit 20 may directly deduce the average usage patterns from the time series determined at step 110. In an embodiment, the pattern recognition unit 20 may perform pattern recognition algorithms via data mining (and more specifically, machine learning) algorithms. For example, the pattern recognition unit 20 may perform an unsupervised classification of the datasets (or directly of the temporal series) such as a clustering method. By performing such unsupervised classification of the datasets, the pattern recognition unit 20 is able to obtain, on the one hand, the number of distinct average usage patterns to be identified from the collected data. For example, if the data is collected at step 100 during a full week (from Monday to Sunday), the pattern recognition unit 20 using unsupervised classification methods may lead to two distinct average usage patterns: a first usage pattern may correspond to an average utilization of the device EQ by the user on a typical weekday (for example, when the user is on a day of work) while a second usage pattern may correspond to an average utilization of the device EQ by the user on a weekend day (for example, when the user is on a day off work). Some time series obtained during the full week data collection may be classified in the first usage pattern (typically, time series collected on Monday to Friday) while some other time series obtained during the full week data collection may be classified in the second usage pattern (typically, time series collected on Saturday and Sunday). Indeed, the utilization, rate of charge, discharge and recharge of the device EQ and thus the average usage patterns may vary depending on the life pattern of the user (i.e., if the user is working or on vacation), on the life environment of the user (i.e., on the light conditions of the place the device EQ is used), on the seasons (e.g., the light received by the device EQ during a time span of the average usage pattern may differ in winter and in summer), on the weather . . . . On the other hand, the pattern recognition unit 20 is able to obtain an average repartition of the features and the values of their driving parameters, such repartition also reflecting the discharging rate of the battery BAT of the device EQ. The pattern recognition unit 20 may also perform a supervised classification in order to determine at least one average usage pattern of the device EQ, notably if the number of distinct average usage patterns may be assumed (for example, if the user has provided information about his or her various usage modes of the device EQ). The pattern recognition unit 20 may also divide the dataset into training, test and validation sets based on which machine learning algorithms such as convolutional neural networks may be performed. The average usage patterns may thus be obtained by the pattern recognition unit 20 based on the training of part of the collected data. The average usage patterns obtained by the pattern recognition unit 20 are the result of classification models trained by the pattern recognition unit 20 at step 120. The expected number of distinct average usage patterns may be obtained based on data collected at step 100. Such number of distinct average usage patterns may be obtained by an unsupervised classification model, by a user information input or be deduced by the device EQ based on data collected at step 100. For example, based on data obtained from the user's digital agenda (such as data related to a trip planning, a professional meeting, a doctor appointment etc.), the device EQ is potentially able to collect data related to diverse usage modes of the device EQ based on whom average usage patterns may be determined.

The number and the aspect of the established average usage patterns notably depend on each user and on the conditions of collecting data at step 100 (specifically, on the period of time during which data is collected at step 100).

An example of a pattern recognition step 120 will be further detailed in the description of FIG. 5.

As the outcome of step 120, one or several average usage patterns of the device EQ are determined. In an embodiment, steps 100 to 120 have been performed so that the established average usage patterns reflect the different utilizations of the electrochromic eyewear device EQ by the user.

At steps 200, 210 and 300, the device EQ proceeds to a customized piloting step.

Such customized piloting step aims at determining customized values of the parameters that drive the features of the electrochromic eyewear device EQ, so that such parameters are piloted following a battery optimization mode.

The customized piloting step first comprises an operation consisting in retrieving and gathering, at step 200, data related to an ongoing use of the device EQ by the user. Such step 200 may be performed by the data prediction unit 30 of the processing unit PROC and/or another unit of the processing unit PROC. Step 200 occurs at a considered time (or date) T. Prior to such time T, steps 100, 110 and 120 are considered to have occurred—possibly, in a continuous way as a background process-so that at least one average usage pattern specific to the user have been determined at step 120. At the considered time T, the electrochromic eyewear device EQ is operating and utilized by the user. In particular, the battery BAT has an ongoing state of charge $SOC_T$.

At step 200, the processing unit PROC retrieves data which timestamp belongs to the time neighborhood of the considered time T. Such time neighborhood may for example correspond to a range of one or several hours prior to the considered time T. In particular, such time neighborhood may correspond to the maximal gap duration between the beginning time of each average usage pattern and the considered time T. For example, if a first average usage pattern spreads on a full day (that is, 24 hours) and starts at 9 am, all data collected between 9 am and the considered time T will be retrieved by the processing unit PROC at step 200 (for example, if the considered time T is 1 pm on a day N, the data timestamped between day N at 9 am and day N at 1 pm will be retrieved; if the considered time T is 6 am on day N, the data timestamped between day (N−1) at 9 am and day N at 6 am will be retrieved).

The retrieved data may for example belongs to the data collected at step 100, possibly after such collected data has been pre-processed and/or partially analyzed by the processing unit PROC. The data retrieved by the processing unit PROC at step 200 may particularly comprise data related to the utilization of the device EQ by the user in the time neighborhood of the considered time T. The data retrieved by the processing unit PROC may also comprise data related to the environment surrounding the device EQ in the time neighborhood of the considered time T. In particular, the processing unit PROC also records the ongoing state of charge $SOC_T$ of the battery BAT of the device at the considered time T. By definition, the ongoing state of charge $SOC_T$ is timestamped with the considered time T.

Such retrieved data may form a test dataset.

The customized piloting step then comprises an operation consisting in predicting, at step 210, the customized values to be applied to the parameters. Such prediction operation may be performed by the data prediction unit 30 of the processing unit PROC.

To that end, the data prediction unit 30 proceeds to identify the selected average usage pattern followed by the retrieved data. Such selected average usage pattern is for example determined by inputting the test dataset in the classification models built at step 120.

At step 210, the data prediction unit 30 classifies the test dataset in the selected average usage pattern. The considered time T is also identified on the timeline (or timespan) of the selected average usage pattern. As a consequence, at step 210, the data prediction unit 30 is able to predict the usage of the device EQ by the user following the considered time T, such predicted usage being detailed in the selected average usage pattern. In particular, such usage prediction provides a quantification of the amount of energy required by the device EQ in order to sustain the predicted usage of the device EQ from the considered time T.

At this stage of step 210, the data prediction unit 30 obtains, at the considered time T during an ongoing utilization of the device EQ by the user:

- the ongoing state of charge $SOC_T$ of the battery BAT. That is, at the considered time T, the data prediction unit 30 obtains the remaining amount of energy that the device EQ is able to provide; and
- the future utilization of the device EQ—and thus, the required amount of energy-until a recharging time of the device EQ; and in particular,
- the repartition, in time, of the energy consumption of the user throughout the future utilization of the device EQ.

Based on such information, at step 210, the data prediction unit 30 is able to determine a customized piloting of the parameters driving the features of the device EQ in order to meet both the required amount of energy for the future utilization of the device EQ and the constraint of the remaining amount of energy that the battery BAT is able to provide. Determining such customized piloting consists in determining data related to customized values to be applied to the parameters driving the features of the device EQ. Such customized values may for example consist in one or several time series to replace the pre-set values driving the features of the device EQ in the standard mode. The data prediction unit 30 may determine as many time series of customized values as the number of parameters driving the features. Each time series of customized values may provide an economy piloting of the parameters starting at time T and during the whole timespan of the selected average usage pattern.

The determination of the customized values at step 210 will be further detailed in the description of FIGS. 4 and 5.

The customized piloting step eventually comprises an operation consisting in piloting, at step 300, the parameters according to the customized values. In step 300, data related to the customized values to be applied to the parameters may be transmitted from the data prediction unit 30 of the processing unit PROC to the control unit CTRL. Data related to the customized values may be time series of explicit customized values. In that case, such customized values are directly applied by the economy driving unit 4 for performing the battery optimization piloting. In another embodiment, the data related to the customized values may be time functions to be applied to existing values currently piloting the feature parameters. In that case, such functions may be applied by the economy driving unit 4 of the control module CTRL on the pre-set values driving the parameters of the device EQ in the standard mode.

Step 300 enables the electrochromic eyewear device EQ to run in a battery optimization mode with a customized piloting of the parameters driving the device EQ features.

At an optional step 400, the device EQ may proceed to a piloting feedback step. Such piloting feedback step may consist in the collection of feedback data related to the utilization of the device EQ while feature parameters are piloted with customized values. Such piloting feedback step may be a continuous background process. The feedback data may be gathered with the data collected at step 110 in order to quantify the accuracy of the classification models established at step 120.

It is now referred to FIGS. 4 and 5. FIGS. 4 and 5 focus on the customized piloting of electrochromic cell parameters. It will notably be described how the customized values are determined at step 210, based on the average usage pattern of the user of the device EQ, selected at step 210. It is considered that the electrochromic eyewear device EQ provides a plurality of states of tint and the user utilizes several features of the device EQ, including electrochromic cell features of the device EQ. In particular, it is considered that the user utilizes several states of tint among the provided states of tint and the device EQ is thus required to perform several changes (or transitions) between the several used states of tint.

At step 210, based on the retrieved data, the device EQ is able to select an average usage pattern among a plurality of estimated average usage patterns, such selected average usage pattern being considered to reflect the utilization of the device EQ by the user around the considered time T. Two average usage patterns are for example represented on FIG. 5. A first average usage pattern, represented in continuous lines, may reflect a typical utilization of the device EQ by the user on a working day of the user (for example on a weekday). A second average usage pattern, represented in dotted lines, may reflect a typical utilization of the device EQ by the user on a vacation day of the user (for example on a day off/weekend). In other embodiments, average usage patterns estimated by the device EQ may differ from the average usage patterns represented on FIG. 5. For example, the device EQ may distinguish several average usage patterns for working days of the user, such as working days at the office and working days in remote. The first and second average usage patterns may be determined based on data collected at step 100.

Each of the first and second average usage patterns represented on FIG. 5 may include a variation P1, P2 of the incoming luminous flux (e.g., measured in lux) received by the device EQ within the timeline of each average usage pattern. Such incoming light variation is represented on the above graph of FIG. 5. Each average usage pattern may also include a distribution (or repartition) of typical values of the feature parameters within the timeline of each average usage pattern. For example, referring to the above graph of FIG. 5:

- the different states of tint ST0, ST1, ST2, ST3 (or ST0-ST3) used by the user throughout the timeline of each average usage pattern are represented.
- the number of transitions between the different used states of tint ST0-ST3 throughout the timeline of each average usage pattern is represented. For example, between 2 μm and 7 μm, the device EQ measures that 10 transitions are performed between states of tint ST1 and ST2.

Each of the first and second average usage patterns represented on FIG. 5 may also include a variation C1, C2 of the remaining disposable state of charge of the battery BAT of the device EQ. Such variation C1, C2 of the remaining disposable state of charge of the battery BAT is represented on the below graph of FIG. 5. The variations C1, C2 may reflect the power consumption of the features used by the user according to the distributions P1, P2. The variations C1, C2 of the remaining disposable state of charge of the battery BAT may be based on data collected at step 100*a* and related to various utilizations of the device EQ in the standard mode. In particular, the distributions P1, P2 reflect ideal values of the feature parameters. Such ideal values may correspond to required values of feature parameters in order to provide a comfortable use of the device EQ to the user (that is, a use without restriction for the user). Such ideal values may correspond to values reflecting the effective conditions of use of the features of the device EQ by the user. In particular, the pre-set values of feature parameters enable the feature parameters to reach the ideal values.

The distributions P1, P2 of ideal values of the feature parameters as well as the variation C1, C2 of the remaining disposable state of charge of the battery BAT of the device EQ are average distributions and variations. Such average distributions and variations may be determined by the processing unit PROC based on a mean, a median or another representative value of a plurality of time series collected at step 100. Such average distributions and variations are considered to represent typical distributions and variations in each usage mode of the device EQ.

It is considered, based on the retrieved data at step 200 and on the considered time T that the selected average usage pattern is the first average usage pattern. The selected average usage pattern begins on a day N at 7 am and ends on the same day N at 11 pm (i.e., at 23 hours on FIG. 5). The time is expressed on FIG. 5 in a 24-hour time system. Equivalently and for the sake of simplicity, the description will express time in a 12-hour time system.

For example, at a considered time T=11 am, the retrieved data provides that, as reflected in the selected average usage pattern P1:

- the utilization of the device EQ started around 7 am (for example, the user wakes up at 7 am and switches the device EQ on),
- between 7 am and 8 am, states of tint ST1 and ST2 of the device EQ are used and around 5 transitions between such states of tint ST1 and ST2 are performed (for example, the user is at home and prepares to go to work),
- between 8 am and around 9 am, states of tint ST2 and ST3 of the device EQ are used and around 30 transitions between such states of tint ST2 and ST3 are performed (for example, the user goes to the work office),
- from around 9 am to the considered time T, states of tint ST2 and ST3 of the device EQ are used. The device EQ has performed for example 4 transitions so far, since 9 am.

At the considered time T, the battery BAT of the electrochromic eyewear device EQ has a current state of charge $SOC_T$. Based on the selected average usage pattern and more particularly on the average distributions P1 of incoming light, used features and parameters, the device EQ is able to predict customized values of the feature parameters. The customized values are determined so that the average distribution P1 of used features and parameters may be provided to the user by the device EQ without feature and/or feature parameter degradation and/or restriction (and thus guaranteeing a comfort of use of the device) and using the remaining disposable state of charge $SOC_T$ of the battery BAT.

Thus, referring to FIG. 5, the determination of the customized values takes into account that the device EQ is required:

to be used without interruption until 11 pm, to be able to provide the required states of tint and number of transitions between such states of tint, providing the remaining disposable state of charge $SOC_T$ of the battery BAT.

The average usage patterns represented on FIG. 5 reflect the use of electrochromic cell features and particularly the use of different states of tint ST0-ST3 and transitions between such different states of tint ST0-ST3. The considered features are thus parameters related to the states of tint (such as the number of provided states of tint, here four) and to the change of state of tint (such as the number or the speed of transition of transitions between different states of tint). For the sake of simplicity, the distribution of ideal values of other parameters driving the used features or of parameters driving other used features are not represented on the selected average usage pattern. In other embodiments, the average usage patterns may also reflect the use of other features—electrochromic-related or not—and thus involve distributions of the ideal values of parameters driving such features. For example, if a user utilizes the Bluetooth communication feature of the electrochromic eyewear device EQ, the selected average usage pattern may also include a distribution of the number of Bluetooth transmissions performed by the device EQ throughout the timeline of the selected average usage pattern.

It is now referred to FIG. 4. FIG. 4 is a flowchart representing several operations performed by the processing unit PROC of the electrochromic eyewear device EQ in order to determine customized values of parameters driving the features used by the user of the device EQ. Such customized values particularly reflect a modified driving of such parameters compared to the pre-set values driving the parameters in standard mode. Indeed, the determination of such customized values takes into account the distributions of ideal values of the used feature parameters of the selected average usage pattern and the remaining disposable state of charge $SOC_T$ of the battery. The determination of customized values thus aims at providing customized values reaching the ideal values throughout the timespan of utilization of the user. The determination of customized values also enables to optimize the battery consumption of the device EQ.

At the stage of step 210, the processing unit PROC has determined the selected average usage pattern. Such selected average usage pattern is for example represented on FIG. 5. Such selected average usage pattern notably includes the distribution P1 of the ideal values of feature parameters driving the used parameters.

The processing unit PROC then proceeds to determine the customized values.

In a step 211, the processing unit PROC may determine customized values of the electrochromic cell parameter corresponding to the number of states of tint of the lenses LS provided by the device EQ. Such customized values may notably consist in reducing the number of available states of tint compared to the pre-set values of the number of provided states of tint in standard mode. In particular, such reduction of the number of provided states of tint is adapted to the ideal values of number of states of tint in the selected average usage pattern. The reduction of the number of provided states of tint may thus consist in only providing the states of tint effectively used by the user throughout the timespan of the selected average usage pattern. The pre-set values of the number of provided states of tint may set a fixed and predefined number of states of tint provided by the device EQ, in the present case four distinct states of tint ST0-ST3. All four states of tint ST0-ST3 may be permanently provided by the device EQ in standard mode, independently from the number of states of tint effectively used. In the battery optimization mode, the processing device PROC may provide variable customized values of the number of provided states of tint. For example, based on the selected average usage pattern represented on FIG. 5, the processing unit PROC is able to predict the different required states of tint throughout the timespan of the selected average usage pattern. Thus, the customized values of the number of provided states of tint may consist, at the considered time T, in:

setting an availability of two states of tint ST1 and ST2 from the considered time T to noon, setting an availability of three states of tint ST1, ST2 and ST3 between noon and 2 pm, setting an availability of two states of tint ST1 and ST2 between 2 μm and 8 μm, and setting an availability of two states of tint ST0 and ST1 between 8 μm and 11 pm.

Such setting of customized values of the number of provided states of tint varying throughout time depending on the selected average usage pattern enables the electrochromic eyewear device EQ to save battery by reducing the number of provided states of tint. Such reduction of the number of provided states of tint has yet no impact on the utilization of the device EQ by the user, since such reduction is adapted to the utilization of the user and enables the states of tint to remain available to the user when required.

Such adaptation of the provided states of tint also enables the device EQ to save battery by not providing power-consuming states of tint when such states of tint are not required by the user. Indeed, considering for example that the states of tint ST0-ST3 correspond to different classes of tint, an availability of the device EQ in the third ST2 or fourth ST3 class of tint is more power-consuming than an availability of the device EQ in the first ST0 or second ST1 class of tint.

In a step 212, the processing unit PROC may determine customized values of the number of levels of transmissions provided in each state of tint. The determination of such customized values may notably consist in reducing the number of levels of transmission per state of tint provided by the pre-set values of levels of transmission per state of tint in standard mode. For example, the electrochromic feature of the device EQ consisting in providing different classes of tint (corresponding to four classes of tint ST0-ST4 for example) of the lenses LS is considered. Each class of tint is considered to provide a more or less tinted or bleached aspect to the lenses LS of the device EQ so that each class of tint enables the transmission of a given level of light. Such given level of light is referred to as the level of transmission of the class of tint. The following table provides an example of levels of transmissions provided per class of tint in standard:

| Class of tint | Example of level of transmission in standard mode | Example of level of transmission in battery optimization mode |
|---|---|---|
| ST0 | 70 to 100 percent | 100 percent |
| ST1 | 43 to 70 percent | 70 percent |
| ST2 | 18 to 43 percent | 43 percent |
| ST3 | 8 to 18 percent | 18 percent |

As a consequence, the determination of customized values related to the levels of transmission of respective states of tint may consist in reducing the sensibility of each state of tint, so that each state of tint provides a reduced panel of light transmission. For example, it is referred to the table representing the level of transmission in standard and battery optimization modes for each class of tint. In standard mode, when class of tint ST3 is used, the device EQ transmits between 8 percent and 18 percent of the incoming light to the user. Such class of tint ST3 may for example be used when the user is exposed to an important amount of sunshine, for example corresponding to a luminous flux around 100,000 lux. In battery optimization mode, the customized values of the level of transmission of class of tint ST3 may be reduced to a unique level of transmission value of 11 percent. Such reduction of the level of transmission may be performed throughout the timeline of the selected average usage pattern by the processing unit PROC on states of tint which are unutilized by the user throughout such timeline.

In a step 213, the processing unit PROC may determine customized values of the number of transitions enabled between different states of tint. The determination of such customized values may notably consist in reducing the number of available transitions between different states of tint with respect to the pre-set values of available number of transitions between such different states of tint in standard mode. Indeed, transitions performed by the device EQ is a source of power-consumption and the higher the number of transitions is, the more power the device EQ consumes.

In standard mode, the number of transitions between different states of tint may be unlimited, providing the remaining available state of charge of the battery BAT. That is, the pre-set values of the number of provided number of tint transitions may impose no transition restriction to the utilization of the device EQ, until the disposable state of charge of the battery BAT runs out and the device EQ is unable to perform any tint transition at all.

Compared to standard mode, the battery optimization mode consists in taking into account the distribution P1 of the number of transitions required by the user of the device EQ in the selected average usage pattern as well as the nature of such transitions. For example, the nature of such transitions may consist in determining if such transitions are successive tint transitions (such as transitions between states of tint ST1 and ST2, or states of tint ST2 and ST3), transitions between different levels of transmission with one given state of tint, or transitions with more tint fluctuation (such as transitions between states of tint ST1 and ST3, or states of tint ST0 and ST2 for example).

The determination of customized values related to the number of transitions between different states of tint may consist in adapting a lux hysteresis associated to each state of tint. The lux hysteresis of a state of tint refers to a lag value (for example, expressed in percentage of incoming luminous flux, measured in lux) associated to each value interval (for example, lux interval) corresponding to such state of tint. The lux hysteresis may for example enable to compensate the slight variations of incoming light compared to the range of the lux value interval, so that a tint transition is not performed as soon as a light fluctuation (even by a few lux for example) is detected by the device EQ. In standard mode, the lux hysteresis of each state of tint may be around 20 percent. For example, considering a class of tint ST1 corresponding to a lux value interval between 50 lux and 500 lux, the pre-set value of lux hysteresis of 20 percent enables to include light fluctuations between 50*0.2 lux below 50 lux and 500*0.2 lux above 500 lux into the class of tint ST1. Thus, if the incoming luminous flux is between 40 lux and 600 lux, the triggered class of tint is ST1.

In battery optimization mode, the lux hysteresis may be adapted—and particularly, may be increased with respect to the pre-set values of lux hysteresis—so that the number of transitions performed by the device EQ may be controlled and furthermore reduced. For example, the customized values of lux hysteresis may be set a higher value than the pre-set values of lux hysteresis, such as 30 percent. Thus, in battery optimization mode, the incoming light between 35 lux and 650 lux will trigger the class of tint ST1: compared to standard mode, the battery optimization mode limits tint transitions when the incoming luminous flux varies from a lux value in class of tint ST1 to a lux value between 35 and 40 lux (which in standard mode, may corresponds to another class of tint or another level of transmission of class ST1) or between 600 and 650 lux (which in standard mode, may correspond to another class of tint or another level of transmission of class of tint ST1).

The customized values of lux hysteresis may also be determined based on an explicit number of transitions limited in battery optimization mode. For example, referring to FIG. 4, the total number of transitions performed by the device is 145, with a pre-set value of lux hysteresis of each states of tint ST0-ST4 around 20 percent. The battery optimization mode may consist in reducing the number of transitions performed to 100 and determining the lux hysteresis providing 100 transitions of the device EQ.

The determination of customized values related to the number of transitions between different states of tint may also consist in adapting an integration time associated to each state of tint. In particular, the battery optimization mode may consist in increasing the integration time of an incoming factor (such as an incoming luminous flux or any other triggering factor of a state of tint) compared to pre-set values of integration time in standard mode. For example, in the case of states of tint corresponding to classes of tint, the battery optimization mode may consist in increasing the integration time of incoming luminous flux, so that a tint transition is performed by the device EQ only after such incoming luminous flux is measured during such integrated time. In that way, the battery optimization mode enables to avoid performing tint transitions on temporary light fluctuations. For example, if a user punctually receives an increased luminous flux when he/she walks by a window inside the office, increasing the integration time compared to pre-set values of integration time enables to avoid performing a tint transition based on such punctual light fluctuation. In a case of a state of tint corresponding to a blue light filter for example, the time integration of the incoming blue light may be increased. In a case of a state of tint corresponding to a color, a triggering factor of such color may be the detection of an emotional state of the user, for example via the sensing interface INT of the device EQ. The increase of the integration time in battery optimization mode may consist in increasing the time of observing a given emotional state (based for example on collected data reflecting such emotional state) compared to the pre-set time, before activating the colored lenses LS.

The determination of customized values related to the number of transitions between different states of tint may be reduced compared to the pre-set values of the number of transitions in standard mode by limiting the number of transitions throughout the timeline of the selected average usage pattern, for example based on the repartition P1 of ideal values of the number of transitions in the selected average usage pattern. For example, at the considered time T, the processing unit PROC may limit the number of transitions to three transitions until noon, considering based on the retrieved data, that the device EQ has already performed four transitions from 9 am to the considered time T.

In a step 214, the processing unit PROC may determine customized values of the speed of transition between different states of tint. The determination of such customized values may notably consist in reducing the speed of transition between different states of tint with respect to the pre-set values of speed of transition between such different states of tint in standard mode. Indeed, in standard mode, the speed of transition between two given states of tint may be maximized in order to enable a state of tint to be reached as fast as possible when an incoming light fluctuation occurs. For example, the standard mode may consist in maximizing the speed of transition between two states of tint by:

- applying an overvoltage (also referred to as a pulsed mode) when a transition between two states of tint consists in a tint darkening (for example, in a case of a transition from state of tint ST0 to state of tint ST1), and
- applying a reverse polarity (also referred to as a reversed pulse mode) when a transition between two states of tint consists in a tint bleaching (for example, in a case of a transition from state of tint ST2 to state of tint ST0).

Such maximized speed of transition between two given states of tint may be pre-set in standard mode, so that the amplitude of any tint fluctuation may be maximized when any light fluctuation occurs. Such speed maximization is particularly power-consuming. In battery optimization mode, the determination of customized values related to the speed of transition between different states of tint may consist in applying a progressive voltage to the electrical circuit linked to the electrochromic stack of the device EQ, so as to reduce such speed of transition.

In particular, such speed reduction may depend on the selected average usage pattern and more specifically on the transitions between states of tint utilized by the user throughout the timeline of such selected average usage pattern. For example, referring to FIG. 5, between noon and 2 pm, it may be determined, based on the distribution P1, that the tint transitions mainly involve transitions between states of tint ST1, ST2, ST3. In such case, the speed reduction may be applied to uninvolved states of tint ST0 (for example, the speed reduction may be applied to a transition between state of tint ST0 and any other state of tint ST1, ST2, ST3).

The determination of customized values for the speed of transition between two classes of tint may also be performed based on the required amplitude of state of tint transition. For example, the speed reduction may only be performed on transitions between successive states of tint (such as transitions between states of tint ST1 and ST2, or states of tint ST2 and ST3 for example), since it may be considered that such transitions between successive states of tint involve little light fluctuation compared to transitions between states of tint ST1 and ST3 or ST0 to ST3 for example.

At a step 215, the determination of customized values may also consist in cutting other functionalities of the device EQ which are unused, based on the selected average usage pattern.

The operations 211 to 215 are time—variable-notably depending on the timeline of the selected average usage pattern—and may be performed concurrently, cumulatively, or alternatively.

Optionally, the battery optimization mode may be activated providing that the power consumption of the used features—determined for example based on the variation C1 of the remaining state of charge of the selected average usage pattern—is superior to the remaining disposable state of charge $SOC_T$ at the considered time T, which thus means that a battery optimization mode is required. The battery optimization mode may also be intentionally activated or deactivated by the user. The battery optimization mode may also be activated permanently, based on a state of charge threshold or based on a user selection.

The steps 211 to 215 may be performed in order to reduce the power consumption of the functionalities, electrochromic-related or not, based on a prediction of the utilization of the device EQ by the user. In the case of electrochromic-related features, steps 211 to 215 may be adapted to the use of any states of tint, including the classes of tint, filters and/or colors provided by the device EQ. Such states of tint may have different triggering factors: the preservation and/or transitions of classes of tint are triggered by incoming luminous flux, the preservation and/or transitions of filters may be triggered by incoming luminous flux and more particularly by incoming specific radiations in the incoming luminous flux (such as ultraviolets radiations) and the preservation and/or transitions of colors may be triggered by emotional and/or human sensing factors. The proposed steps 211 to 215 and the battery optimization mode may be performed to optimize the power consumption of the overall electrochromic eyewear device EQ.

The invention claimed is:

1. A method performed by a battery-powered electronic eyewear device for managing a battery consumption of said eyewear device based on a utilization of said eyewear device by a user, the eyewear device comprising at least one electrochromic cell, the method comprising:

recording data related to the utilization of the eyewear device by the user, said utilization being based on at least the use of at least one electrochromic cell feature of the eyewear device by the user, said electrochromic cell feature being driven by at least one electrochromic cell parameter, analyzing said recorded data and determining at least one average usage pattern of the eyewear device by the user, said average usage pattern comprising:

an average repartition of ideal values of the electrochromic cell parameter in the average usage pattern, and/or an average repartition of power consumption of the eyewear device by the user in the average usage pattern, adapting the management of the battery consumption of the eyewear device by piloting values of the electrochromic cell parameter based on at least the average usage pattern of the user and on charging data related to a remaining state of charge of the battery.

2. The method according to claim 1, wherein the management of the battery consumption is adapted when the remaining state of charge of the battery is below a predetermined value.

3. The method according to claim 1, wherein the piloting of values of the electrochromic cell parameter varies over time depending on the average usage pattern.

4. The method according to claim 1, the electrochromic cells of the eyewear device providing at least two different states of tint, several electrochromic cell features of the eyewear device being used by the user, such use comprising at least the use of different states of tint among the provided states of tint, and wherein the electrochromic cell features comprise at least one element among:

a tint transition between the different used states of tint, and a tint preservation within a used state of tint.

5. The method according to claim 4, wherein the electrochromic cell parameters comprise at least one element among:

data related to each provided state of tint, data related to a number of transitions between the different provided states of tint, and data related to a speed of transition between the different provided states of tint.

6. The method according to claim 1, the data related to the utilization of the eyewear device being recorded over a predefined period of time, and wherein the recorded data comprises at least one element among:

measurements of luminous flux sensed by the eyewear device within the predefined period of time, measurements of a discharging time of the battery, a detection of a charging time corresponding to a time when the eyewear device is charged or recharged by a source of energy external to the eyewear device.

7. The method according to claim 1, wherein the average usage pattern comprises an average charging cycle and the average usage pattern is delimited in time within said average charging cycle.

8. The method according to claim 5, wherein the piloting of values of the electrochromic cell parameters comprises a reduction of the number of provided states of tint with respect to a pre-set number of provided states of tint.

9. The method according to claim 5, the electrochromic cells of the eyewear device providing at least two different levels of transmission within each provided state of tint, wherein the piloting of values of the electrochromic cell parameters comprises a reduction of the number of provided levels of transmission of at least one provided state of tint with respect to a pre-set number of provided levels of transmission of said at least one provided state of tint.

10. The method according to claim 8, wherein said reduction of the number of provided states of tint consists in an increasing of a time integration of light measurements associated to each provided state of tint.

11. The method according to claim 8, each provided state of tint being associated to at least one light measurement threshold, and wherein said reduction of the number of provided states of tint comprises a piloting of a lag value applied to each said light measurement threshold.

12. The method according to claim 5, wherein the piloting of values of the electrochromic cell parameters comprises a limitation of the number of transitions between the different provided states of tint with respect to a pre-set number of transitions between the different provided states of tint.

13. The method according to claim 5, wherein the piloting of values of the electrochromic cell parameters comprises a decrease of the speed of transition between the different provided states of tint with respect to a pre-set speed of transition between the different provided states of tint.

14. An eyewear device comprising at least:

an electrochromic cell, a battery powering said eyewear device, and a processing circuit configured to implement the method according to claim 1.

15. A computer program product comprising program instruction code stored on a computer-readable medium for the execution of the method according to claim 1.

* * * * *